INVENTOR.
HARRIS SHAPIRO
BY FLOYD LEVISON
ATTORNEY

United States Patent Office 3,445,701
Patented May 20, 1969

3,445,701
ROTATING ELECTRICAL APPARATUS
Harris Shapiro, Englewood, N.J., assignor to General Dynamics Corporation, Avenel, N.J., a corporation of Delaware
Continuation of application Ser. No. 488,960, Sept. 21, 1965. This application June 24, 1968, Ser. No. 742,959
Int. Cl. H02k 47/22
U.S. Cl. 310—160     8 Claims

ABSTRACT OF THE DISCLOSURE

An induction frequency changing electrical machine is described which has a wound stator and a wound rotor. The stator has two windings which produce motor and generator fluxes of different pole numbers. The rotor winding has a specific pitch which links a predetermined wavelength of the motor and generator fluxes produced by the stator windings, thereby reducing losses and reaction against start up of the machine. An overhung spin motor which has a rotating field corresponding to the motor field of the convertor assists in starting the machine.

---

This is a continuation of Ser. No. 488,960, filed Sept. 21, 1965, which is now abandoned.

This invention relates in general to rotating frequency changers and, more specifically, to an induction frequency changer including a rotating winding which performs a dual function.

Most of the frequency changers presently known in the art require two separate and distinct pieces of electrical machinery normally on a common shaft. One of the pieces of electrical machinery provides the drive motor action, and the other piece of electrical machinery provides the generator action.

The frequency changer of Creedy Patent #2,428,203 is a single unit having (a) multiple stator windings which produce stator fields of different pole numbers, and (b) a rotor with a single winding; both the rotor and stator windings sharing the same magnetic circuit. Motor and generator currents are induced into the rotor winding from the stator fields.

In a frequency changer having a common magnetic circuit, such as described in the Creedy patent, the air gap dimension must be selected to keep the magnetizing current, on the stator winding having the higher number of poles, at a level where the temperature rise of the freqency changing apparatus is maintained at an efficient level and is kept within the limits of available insulation systems.

The air gap value, which is determined by the high pole number stator winding, is relatively small for the low pole number stator winding as compared to that which would be used on a conventional wound rotor motor of similar size, speed and rating and having the same number of poles as that of the low pole stator winding of the frequency changer. Since the low pole number stator winding carries motor currents and is the starting means, it must supply sufficient torque to start and accelerate the frequency changer rotor up near synchronous speed. Consequently, the use of the small air gap will usually result in harmonic torques of sufficient magnitude to prevent the frequency convertor from starting and accelerating to near synchronous speed.

In addition, the stator-rotor slot combination must be selected so as to insure that both pole number stator windings are electrically balanced. The selection of a stator-rotor slot combination for electrical balance may result in a detrimental slot combination as regards to starting, by producing locking torques, for the pole number stator carrying motor currents. The relationship of the pitch of the windings on the rotor and stator, as specified in Creedy, can cause counter action of the induced motor and generator rotor currents such that the frequency changer is inefficient and possibly inoperative.

It is accordingly an object of this invention to provide an improved frequency convertor which is free of the above noted disadvantages.

A further object of this invention is to provide an improved frequency converter using a single stator and rotor core which are in the same magnetic circuit.

Yet another object of this invention is to provide an improved frequency converter with improved start up means which overcomes harmonic and/or locking torques which may otherwise be developed during starting and acceleration.

A further object of this invention is to provide an improved frequency convertor having a winding pitch relationship.

Still another object of this invention is to provide an improved frequency convertor which has a larrge output power to weight ratio.

Yet another object of this invention is to provide an improved frequency convertor which is inexpenesive and simple to manufacture.

A further object of this invention is to provide an improved frequency convertor which has sufficiently low inherent regulation to avoid the requirement for external regulating means.

These and other objects of this invention will become apparent throughout the remaining portion of the specification and in the claims and drawings.

For a meaningful understanding of the invention, reference is made to the following detailed description of an exemplary embodiment thereof, and to the accompanying drawings wherein.

Figure 1:
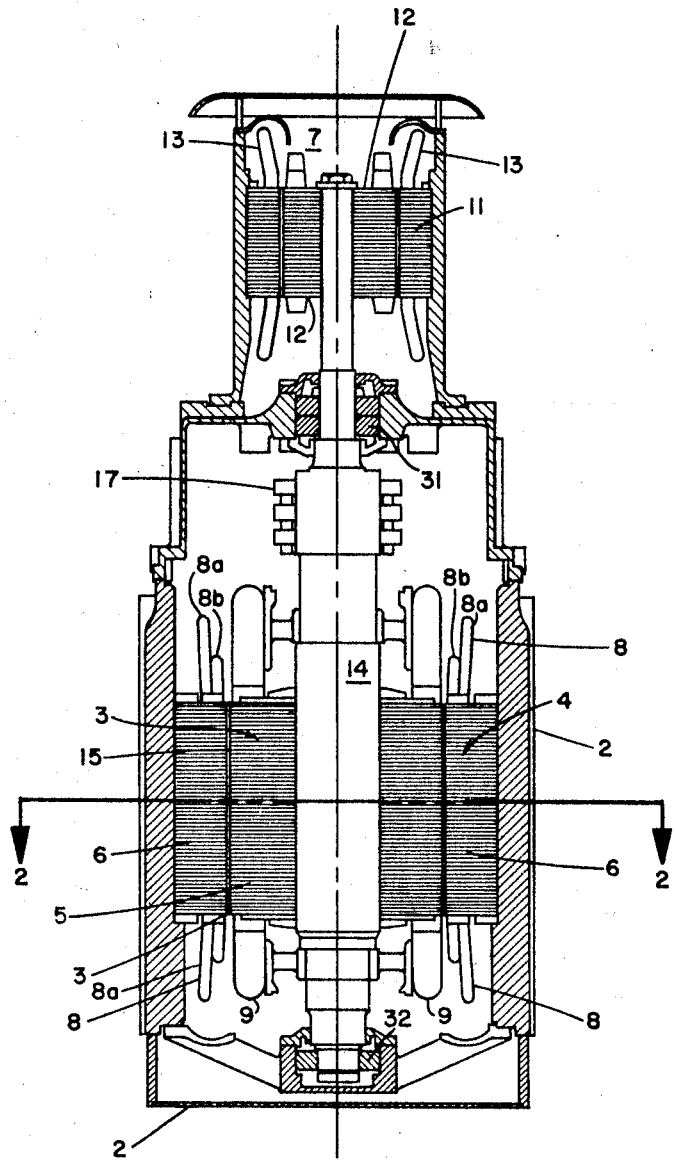
FIGURE 1 is a sectional view of a frequency convertor embodying the present invention, the section being taken along the line 1—1 in FIGURE 2.

In the description which follows, those elements of the FIGURE 1 frequency convertor, which are counterparts of each other, are designated by the same reference numbers. Unless the context otherwise requires, the description hereinafter, of one such counterpart element is to be taken as also applying to all other elements having the same reference numeral.

Figure 2A:
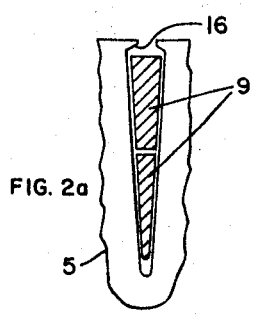
FIGURE 2a is a fragmentary sectional view of one of the rotor slots shown in FIGURE 2.
Figure 2:
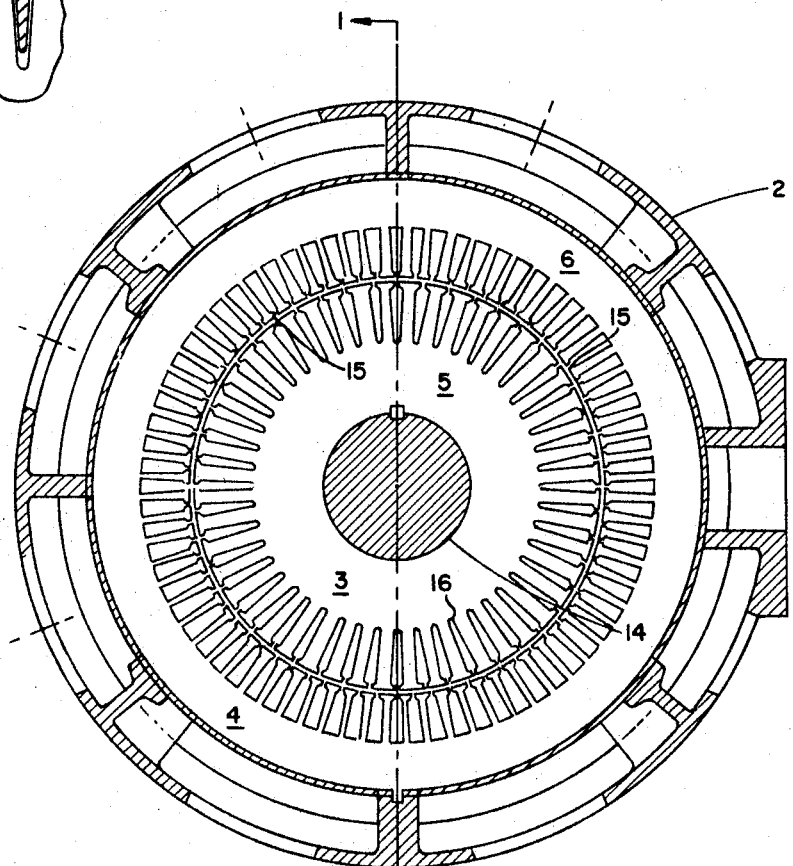
FIGURE 2 is a sectional view taken along the line 2—2 of FIGURE 1.
Figure 2B:
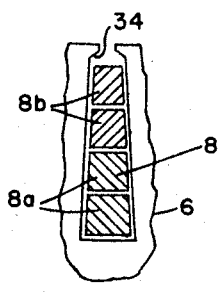
FIGURE 2b is a fragmentary sectional view of one of the stator slots shown in FIGURE 2.

Refering now to FIGURES 1 nad 2, the frequency convertor has a supporting structure 2, a rotor member 3, and a stator member 4. The rotor member 3 and stator member 4 have cores 5 and 6 respectively which define a magnetic circuit. The cores are separated by an air gap 15. A shaft 14 mounted in bearing 31 and 32 supports the rotor 3. A spin motor 7 is mounted on an upper extension of the shaft 14 and provides start up means for the convertor. The supporting structure 2 supports the stator member. A first winding configuration (FIGURE 2b) is mounted in slots 34 of the stator core 6 in such a manner so as to produce two fluxes, a motor flux and a generator flux, of differing pole numbers superimposed in the magnetic circuit, defined by the rotor core 5 and stator core 6. The stator winding is a set of two windings 8a and 8b. A second winding configuration 9 (FIGURE 2a) is mounted in slots 16 in the rotor core 5 in such a manner so as to have induced therein from the stator windings 8 both motor and generator currents.

The spin motor 7 has a stator 11, a rotor 12, and a stator winding 13 mounted on the spin motor stator member 11 in such a manner so as to produce a flux having a pole number which is the same as the pole number of the motor flux produced by stator windings 8.

The spin motor 7 effects the start up rotation of the rotor 3 and accelerates the rotor 3 up to near synchronous speed of the stator winding 8 acting as a motor winding.

The spin motor 7 has a slip r.p.m. at its nominal full load rating substantially equivalent to the slip r.p.m. produced by the interaction of the stator windings 8 acting as a motor winding and the rotor winding 9.

It has been experimentally determined that rotor winding 9 should have a pitch so that the portion thereof which links between .25 and .5 wave length of the motor flux produced by the stator windings 8 and simultaneously links N divided by 2 plus or minus .25 wave lengths of the generator flux produced by the stator windings 8. N is any odd integer whose value shall not exceed the quotient of the pole number of the stator windings 8 acting as a generator winding divided by the pole number of the stator 8 acting as a motor winding.

Figure 3:
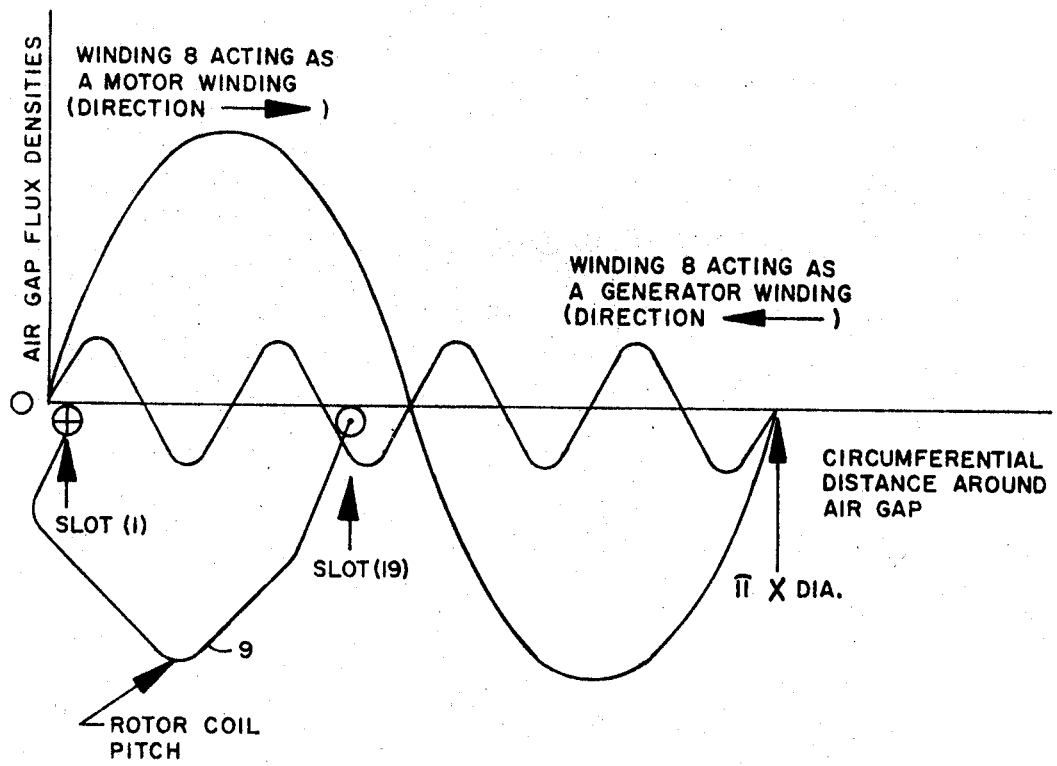
FIGURE 3 is a development of the flux as circumferentially produced by the stator winding showing one of the rotor windings and the pitch thereof.

As indicated on FIGURE 3, the ordinate axis is the air gap flux densities produced by the stator windings 8 and the abscissa axis is the circumferential distance around the air gap 15. Also indicated on the abscissa axis is a representative rotor coil pitch.

Consider the following example: The rotor 3 has a number of rotor slots 16 equal to forty-eight. The stator windings 8 produce a two pole motor flux in the air gap 15. The stator windings 8 produce an eight pole generator flux in the air gap 15. One wave length of the two pole motor flux spans the above referenced to forty-eight rotor slots 16 and one wave length of the eight pole generator flux density spans twelve of the rotor slots 16.

As shown in FIGURE 3, the coils of the rotor winding 9 each are so pitched so as to span eighteen of the rotor slots 16.

Accordingly, the rotor winding 9 links eighteen divided by forty-eight (.375) wave lengths of the motor flux produced by the stator windings 8 and simultaneously links eighteen divided by twelve (1.5) wave lengths of the generator flux produced by the stator windings 8. The first criterion (viz. linkage of 0.25 to 0.50 of the motor flux wave length) is met.

Because N is anyl odd integer whose value shall not exceed the quotient of the pole number of the stator windings 8 acting as a generator winding divided by the pole number of the stator windings 8 acting as a motor winding, the value of N must be one or three and N divided by two must be one-half or one and one-half. The latter ($N=1.5$) is satisfied.

The value of one and one-half plus or minus .25 wave lengths of the stator windings 8 in terms of span of rotor slots 16 is between fifteen and twenty-one rotor slots, or in terms of wavelengths of the generator flux between fifteen divided by twelve or (1.2) and twenty-one divided by twelve or (1.75). Inasmuch as the rotor winding links (1.5) wave lengths of the generator flux produced by the stator windings 8, the second criterion is met.

This linkage criteria is of critical importance in that stator or wound rotor coil linkage, of the revolving air gap flux, of less than .25 wave lengths of the motor flux will result in a machine that is highly inefficient and/or inoperative. This is essentially due to the fact that linkage of less than .25 wave lengths of the motor flux results in using a large number of turns for the same pole flux and, therefore, less copper area per turn per slot is achievable with the inevitable consequence of very high copper losses.

To start the frequency convertor, the stator windings 8 and the stator winding 13 and the spin motor 7 are energized with sixty cycle power. For three hundred cycle output power, which is a typical value used for high speed compressor drive motors, the stator windings 8 are wound to provide a 2 pole motor winding and an 8 pole generator winding, so that the motor flux and generator flux rotates in the air gap 15 in opposite directions, as shown in FIGURE 3. The stator winding 13 mounted on the spin motor stator member 11 is also wound to provide 2 poles. The stator windings 8 energized with sixty cycle power, in combination with the rotor windings 9, produce three hundred cycle power output at the slip rings 17.

The present invention may be embodied in other forms without departing from the spirit or essential characteristics thereof. The present embodiments are, therefore, to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. An induction frequency converter comprising
    (a) a rotor having a single winding thereon,
    (b) a stator disposed around said rotor and spaced from said rotor by an air gap extending circumferentially around said rotor, said stator carrying a motor winding and a generator winding,
    (c) means in said stator including said motor winding for producing in said rotor a first plurality of magnetic poles,
    (d) means in said stator including said generator winding for producing in said rotor a second plurality of magnetic poles higher than said first plurality,
    (e) a spin motor comprising a rotor mechanically coupled to said first-named rotor and a stator,
    (f) said spin motor having a winding carried by said stator,
    (g) means including said spin motor stator winding for producing in said spin motor rotor a plurality of magnetic poles equal in number to said first plurality, and
    (h) means coupled to said first-named rotor winding for extracting alternating current of higher frequency than that applied to said first-named stator windings.

2. The invention as set forth in claim 1 including a shaft, said first-named motor being carried by said shaft, said spin motor rotor also being carried by said shaft at a position thereon spaced axially along said shaft from said first-named rotor.

3. The invention as set forth in claim 2 wherein said spin motor has a slip at its normal full load rating substantially the same as said first-named rotor and said stator including said motor winding thereof acting as an induction motor.

4. The invention as set forth in claim 1 wherein
    (a) said means including said rotor includes a cylindrical core of magnetic material having a plurality of slots uniformly spaced around the outer periphery thereof, said slots extend axially along said cylindrical core, and said rotor winding being disposed in said slots,
    (b) said means in said stator for producing said first plurality of poles a cylindrical core of magnetic material having its inner periphery spaced from said outer periphery of said rotor core by a cylindrical air gap, said stator core having a plurality of slots extending therein from said inner periphery and disposed axially of said stator core, said stator slots being spaced from each other around said inner periphery, said motor winding being disposed in said stator slots, and
    (c) said means including said stator for producing said second plurality of magnetic poles also includes said stator core and said slots therein, said generator winding being disposed in said slots.

5. The invention as set forth in claim 4 wherein said first-named rotor winding is pitched so that each coil thereof spans a predetermined number of rotor slots, said predetermined number of slots being any number where 0.25 to 0.50 wavelengths of the flux produced by said motor winding and $$\left(\frac{N}{2} \pm 0.25\right)$$

wavelengths of the flux produced by said generator windings are linked by each rotor winding coil, where N is any odd integer having a value not exceeding the ratio of the said second plurality to said first plurality.

6. Apparatus for changing the frequency of alternating current comprising
 (a) a rotor member,
 (b) a stator member,
 (c) each of said rotor and stator members having cores which define a common magnetic circuit,
 (d) a support structure for mounting said rotor member for rotation with respect to said stator member,
 (e) windings on said stator member for producing first and second fluxes of different pole numbers, the second being greater than the first, which rotate about said rotor member,
 (f) a winding on said rotor member,
 (g) said rotor winding including a plurality of coils each dimensioned to link 0.25 to 0.50 wavelength of said first flux and $$\left(\frac{N}{2} \pm 0.25\right)$$

wavelength of said second flux, where N is any odd integer less than the ratio of said second pole number to said first pole number.

7. The invention as set forth in claim 5 wherein (a) said rotor core is cylindrical and has a plurality of uniformly spaced slots spaced from each other around the periphery thereof, said slots carrying the coils of said rotor winding, said slots also being parallel to the axis of said rotor core, (b) said stator core is cylindrical and surrounds said rotor core, said stator core having a plurality of uniformly spaced slots parallel to said rotor slots, said stator slots carrying first and second windings for producing said first and second fluxes, and said rotor winding being pitched so that each of said coils spans a predetermined number of slots, said predetermined number of slots being any number covering a distance around the periphery of said rotor core equal to both 0.25 to 0.50 wavelengths of said first flux and $$\left(\frac{N}{2} + 0.25\right)$$

wavelengths of said second flux.

8. The invention as set forth in claim 6 wherein said rotor is carried by a shaft, an induction spin motor on said shaft having a stator winding producing a flux having the same pole number as said first flux.

References Cited

UNITED STATES PATENTS 3,197,660 7/1965 Leischner _____ 310—160
3,177,387 4/1965 Leischner _____ 310—160

MILTON O. HIRSHFIELD, *Primary Examiner.*

L. L. SMITH, *Assistant Examiner.*

U.S. Cl. X.R.

321—63